INVENTORS
JOSEPH J. LATUFF
GEORGE R. FRIEND
BY
Merchant, Merchant & Gould
ATTORNEYS

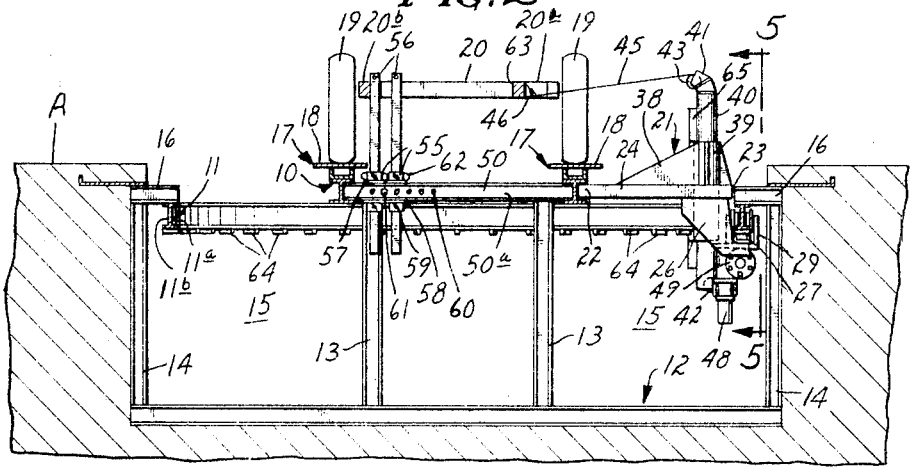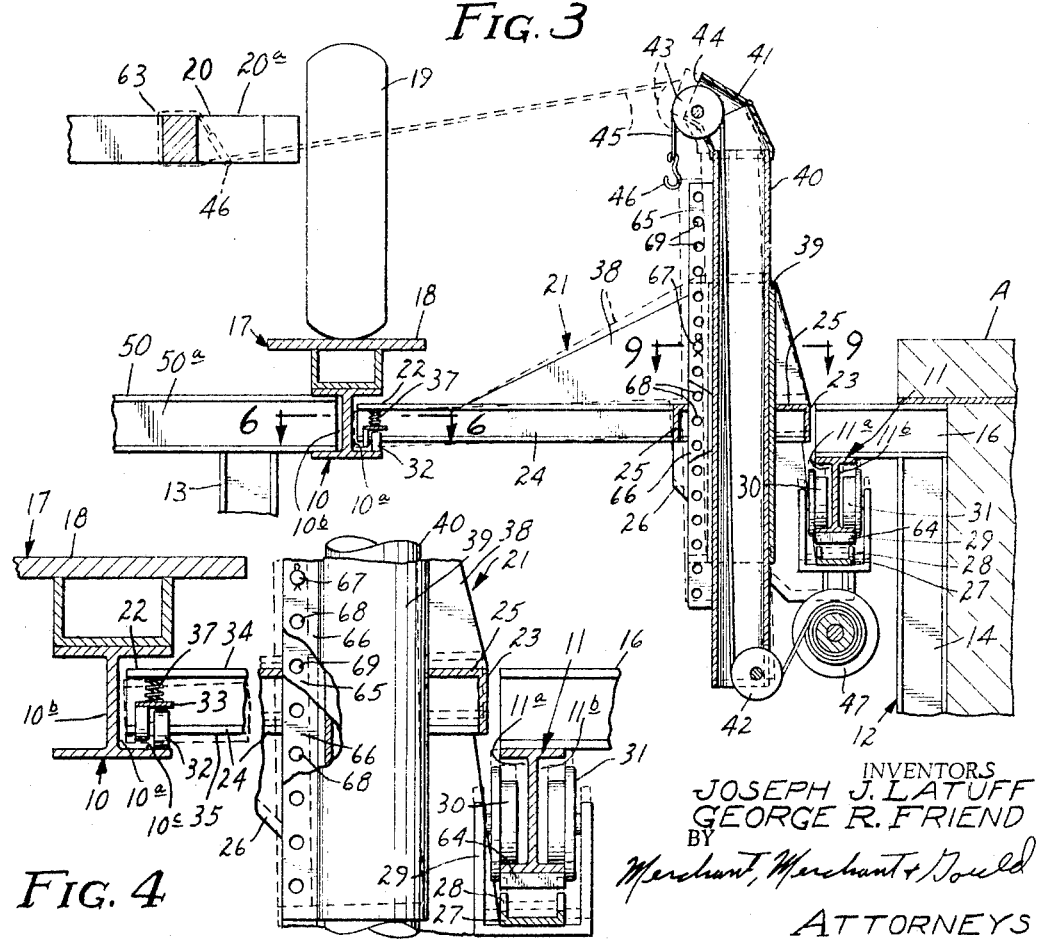

Aug. 30, 1966 J. J. LATUFF ETAL 3,269,169
AUTOMOTIVE VEHICLE FRAME STRAIGHTENING DEVICE
Filed Dec. 20, 1963
3 Sheets-Sheet 3
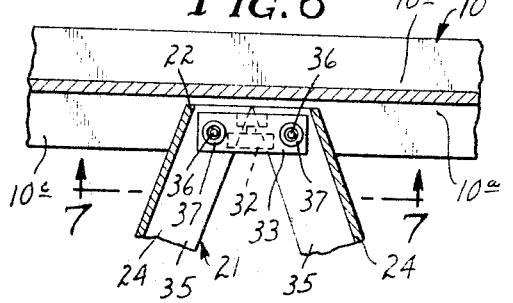
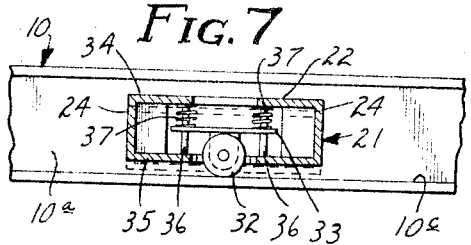
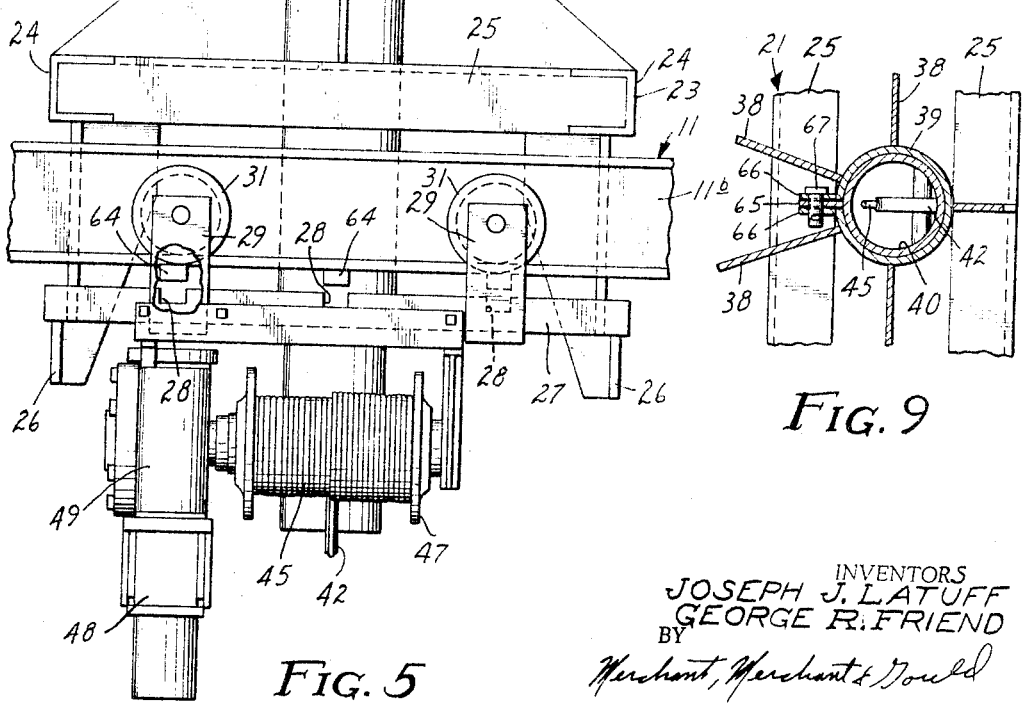
INVENTORS
JOSEPH J. LATUFF
GEORGE R. FRIEND
BY
Merchant, Merchant & Gould
ATTORNEYS United States Patent Office 3,269,169
Patented August 30, 1966

3,269,169
AUTOMOTIVE VEHICLE FRAME STRAIGHT-
ENING DEVICE
Joseph J. Latuff and George R. Friend, St. Paul, Minn.,
assignors to Latuff Bros., Inc., St. Paul, Minn., a corpo-
ration of Minnesota
Filed Dec. 20, 1963, Ser. No. 332,217
9 Claims. (Cl. 72—447)

Our invention relates to devices for straightening of frames of automotive or other mobile vehicles, and has for its primary object the provision of novel means including a mobile winch and mobile bolsters or anchors whereby frame-straightening forces which may be quickly and efficiently applied from opposite sides or one end of a vehicle.

A further object of our invention is the provision of a device of the class immediately above described which incorporates but a minimum of working parts and is rugged and durable in use.

A further object of our invention is the provision of a device of the class above described which is not unduly costly to produce, and is extremely easy to maintain and operate.

A further object of our invention is the provision of a device of the class above described wherein a plurality of mobile winches may be mounted on a single U-shaped track which extends around two sides and one end of a vehicle whereby to simultaneously exert upon an automotive vehicle frame multiple forces so as to greatly reduce the time required in frame-straightening operations.

A further object of our invention is the provision of a device of the class above described whereby vertical as well as horizontal forces may be exerted upon the frame of an automotive vehicle.

The above and still further objects of my invention will become apparent from the following detailed specification, appended claims, and attached drawings.

Referring to the drawings wherein like characters indicate like parts throughout the several views:

FIG. 2 is a vertical sectional view as seen from the line 2—2 of FIG. 1;

FIG. 3 is an enlarged view in fragmentary section as seen from the line 3—3 of FIG. 1;

FIG. 4 is a fragmentary sectional detail taken on the line 4—4 of FIG. 1, on an enlarged scale, some parts thereof being broken away;

FIG. 5 is a fragmentary sectional view taken on the line 5—5 of FIG. 2, on an enlarged scale;

FIG. 6 is a fragmentary sectional view taken on the line 6—6 of FIG. 3, on an enlarged scale;

FIG. 7 is a fragmentary sectional view taken on the line 7—7 of FIG. 6;

FIG. 8 is a fragmentary view in section, as seen from the line 8—8 of FIG. 1, on an enlarged scale, some parts thereof being broken away; and FIG. 9 is a view in horizontal section as seen from the line 9—9 of FIG. 3.

Figure 1:
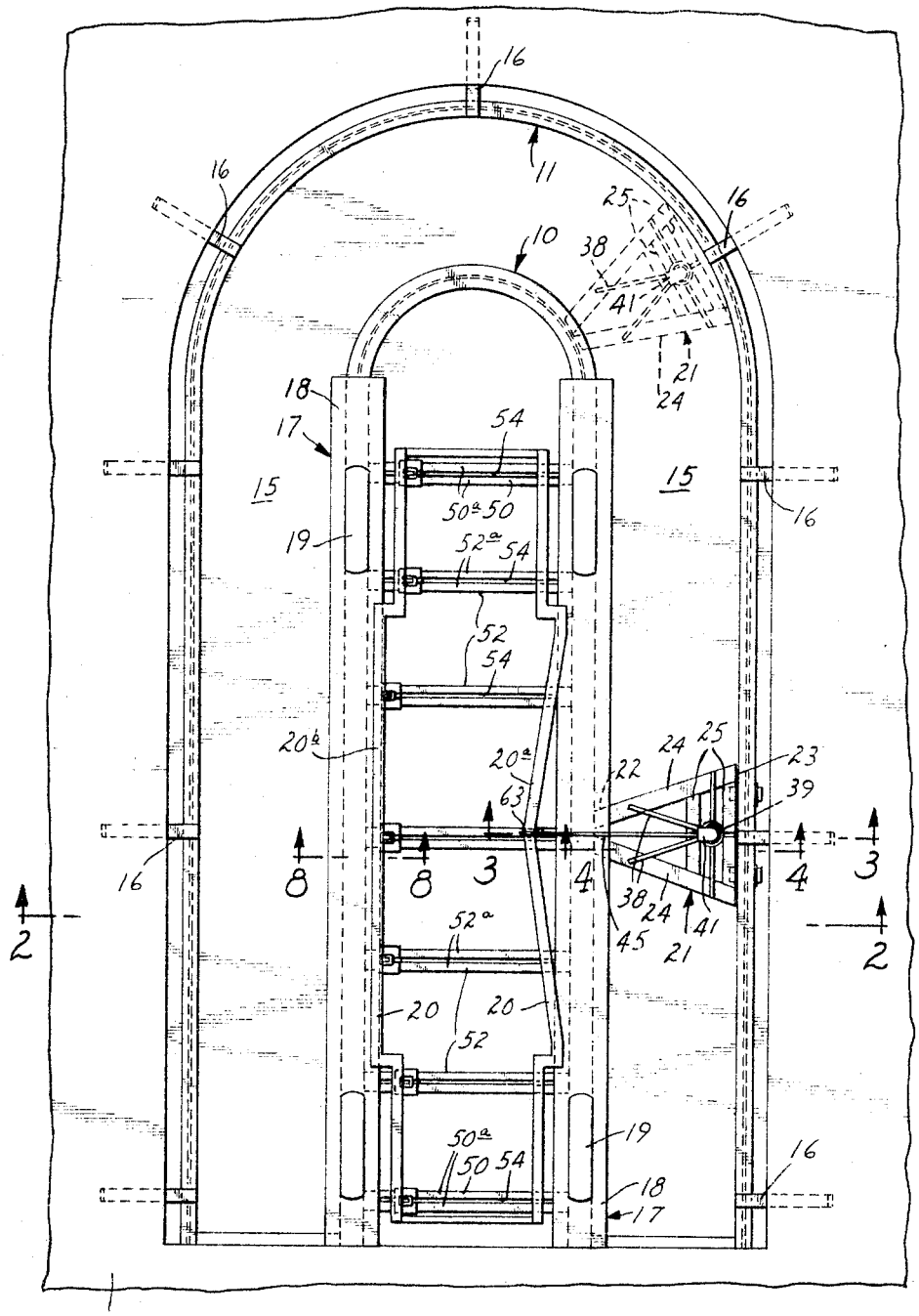
FIG. 1 is a view in top plan of our novel structure.

Referring with greater particularity to the drawings, the numeral 10 indicates a horizontally disposed U-shaped inner frame member, whereas the numeral 11 indicates a laterally spaced parallel U-shaped outer frame member. Preferably, and as shown, the frame members 10, 11 are formed from I-beams so disposed as to define laterally outwardly opening guide-channels 10a, 10b, and 11a, 11b, respectively. Frame members 10, 11 are suitably supported as by supporting frame structure identified in its entirety by 12 and including upstanding legs 13 which support the former, and legs 14 which support the latter, whereby to define therebetween an upwardly opening U-shaped passageway or pit 15. As shown, the outer frame member 11 is fast on and depends from a plurality of cantilever beams 16 carried by the upper end portions of the legs 14.

Suitably supported by the inner frame member 10, and extending longitudinally thereof, are a pair of laterally spaced tread rails 17, the upper surfaces 18 of which are flush with the ground or floor A in which the frame structure 12 is recessed, so as to facilitate movement thereonto of the wheels 19 of a vehicle, only portions, including the frame 20, of which are shown.

A subframe, identified in its entirety by the numeral 21, and preferably being generally V-shaped in plan, extends between the inner and outer frame members 10, 11 with its apex-forming inner end 22 received within the channel 10a of the inner frame member 10, and with its base portion, indicated generally at 23, operatively received within the generally opposed channel 11a of the outer frame member 11. As shown, the subframe 21 comprises a pair of inwardly converging frame members 24, one or more connecting members 25, and vertically disposed depending side mounting plates 26, one each carried by an outer end portion of one of the frame members 24.

Extending transversely between the mounting plates 26, in immediately underlying relationship to the outer frame member 11, is a horizontally disposed U-shaped tie-bar 27, which, for a purpose hereinafter to be explained, is provided with longitudinally spaced upwardly opening notches 28. Fast on the tie-bar 27 are a pair of laterally spaced U-shaped mounting brackets 29 each having a pair of laterally spaced inner and outer roller elements 30, 31 journalled for rotation therebetween. As shown, the inner roller element 30 is received within inwardly opening channel 11a defined by the outer frame member 11, whereas the outer roller element 31 is received within the outwardly opening channel 11b thereof. For an important purpose, which will also be hereinafter explained, the roller elements 30, 31 are of less diameter than the width of the channels 11a, 11b in which they are respectively received, whereby to permit limited vertical movements of the base 23 of the subframe 21.

The apex-forming inner end 22 of the subframe 21 is likewise mounted for limited vertical movements in the channel 10a of the inner frame member 10. Specifically, this is accomplished through the medium of a roller element 32 carried thereby and mounted fast on a carriage 33. The carriage 33 is mounted and guided for vertical movements between the upper and lower walls 34, 35 of the forward end 22 of subframe 21 by means of vertically disposed guide rods 36 extending therebetween; and said carriage 33 is yieldingly biased toward a downward position, whereby to project the roller element 32 below the level of the bottom wall 35, by means of coil compression springs 37 telescopically received over the rods 36 and interposed between the carriage 33 and the upper wall 34. Under this arrangement, it is obvious that under normal longitudinal movements of the subframe 21 along the passageway 15, the forward end 22 is supported by engagement of the wheel 32 with the bottom wall 10c of the channel 10a.

Rigidly supported and carried by the base portion 23 of the subframe 21, preferably, and as shown, through the medium of cross frame members 25 and gussets 38, is a vertically disposed sleeve 39, in which is mounted for vertical adjustments a tubular boom 40. Preferably, and as shown, the upper end portion of the boom 40 terminates in an angularly disposed tubular head 41 which is mounted for rotation on the axis of said boom 40. Journalled for rotation on a horizontal axis in the open lower end of the boom 40 is a sheave 42, whereas a similar sheave 43 is journalled for rotation on a horizontal axis in the tubular head 41, adjacent its open mouth 44. Entrained over the sheaves 42, 43 is a flexible cable 45, the outer end of which terminates in a hook element 46, and the inner end of which is secured to a winding drum 47, carried by the base portion 23. Winding drum 47 is connected to a source of power, such as a hydraulic motor 48 having a gear-reduction unit 49 associated therewith.

For the purpose of imparting rigidity to the inner frame member 10, one or more transverse tie-beams 50 are interposed between the legs 13, preferably, and as shown, with their opposite ends received within channels 10b thereof. Mounted and guided for longitudinal movements between the fixed tie-beams 50, are movable bolster beams 52, also with their opposite ends slidably received within the channels 10b. Specifically, and as shown, the beams 50, 52 are each made up of a pair of channel irons 50a, 52a, in back-to-back opposed spaced relationship whereby to define therebetween longitudinally extended slots 54 which open both upwardly and downwardly. Extending vertically through each of the slots 54 is a guide-sleeve 55, shown as being rectangular in cross section for the slidable reception of an upstanding bolster bar or element 56. Integrally formed with the guide-sleeve 55 and projecting laterally therefrom are upper and lower flanges 57, 58, which positively limit vertical movements of the guide sleeves 55 within the respective slots 54. For the purpose of imparting vertical adjustments of the bolster bars 56 within their respective guide-sleeves 55, set-screws 59 are provided. It will also be noted that the channel irons 50a, 52a are provided with longitudinally spaced aligned apertures 60 through which is adapted to be selectively received abutment-acting stop pins 61, which limit sliding movements of the guide-sleeves 55 and parts carried thereby in a direction to which force is to be applied under a given circumstance, see FIG. 8. Preferably, and as shown, the upper end portions of the guide-sleeves 55 are provided with apertured ears 62, through which flexible anchoring devices of one character or another tied to or wrapped around the frame 20 may be anchored. When it is desired to straighten the frame 20 of a vehicle, wheels 19 of which have been positioned along the tread rails 17, a subframe 21 is moved slidably in the passageway 15 to a position in opposed relationship to a point 63 in one of the side frame members 20a of the frame 20 which is to be straightened or pulled out, see particularly FIG. 1. Thereafter, a suitable number of bolster elements are brought to bear against the opposed side frame member 20b of the frame 20 so as to positively anchor same against movement toward the subframe section 21. Finally, the hook-equipped outer end 46 of the flexible cable 45 is caused to be hooked about the point 63 of the side frame member 20a, and winding movement is imparted to the winch 47 through the hydraulic motor 48 and gear-reduction unit 49. In this manner, the bent or deformed area 63 of the rail 20a is brought back to its original straight position.

To positively lock the subframe 21 against sliding movements in the passageway 15 during actuation of the winch 47 under straightening operations of the type immediately above described, the forward end 22 of the subframe 21 is forced downwardly against the bias of the coil compression springs 37 until the roller element 32 is completely retracted within the subframe 21, whereby to cause frictional engagement of the lower wall 35 with the bottom side wall 10c of the channel 10. Obviously, the same force that causes the inner end 22 of the subframe 21 to drop causes vertical raising movements to be imparted to the outer base end 23 thereof.

Under such raising movements the longitudinally spaced notches 28 in the U-shaped tie-bar 27 are caused to register with and receive selected ones of a plurality of longitudinally spaced transversely extended lock dogs 64, fast on the outer frame member 11 and depending therefrom. Such interlocking positively restricts lateral movements of the frame 21 during actuation of the winch 47. It might here be stated that the lock dogs 64 are positioned along the entire longitudinal dimension of the outer frame member 11 so as to securely anchor the subframe 21 in any position along the passageway 15.

If it becomes necessary to impart vertical adjustments to the boom 40, whereby to achieve the correct height relationship of the angular head 41 with respect to a frame 20 to be worked upon, there is provided the ear 65, which extends longitudinally and projects radially of the boom 40. The sleeve 39 is likewise provided with the ears 66, one each disposed on opposite sides of the ear 65 and each extending longitudinally of the sleeve 39. A locking pin 67 is receivable in one pair of longitudinally spaced, aligned apertures 68 in the ears 66 and a selected one of a plurality of longitudinally spaced apertures 69 in the ear 65, thus locking the head in a desired vertical position. When vertical lifting adjustments are to be imparted to the boom 40, it is only necessary to attach the outer end 46 of the cable 45 to the boom 40, remove the lock pin 67, and cause rotation of the winding drum 47 in a desired direction by means of the motor 48 and gear-reduction unit 49. Obviously vertical lower movements are achieved merely by reversing the direction of rotational movements of said drum 47, so as to permit boom 40 to drop under action of gravity.

While we have here merely described a single operation, it should be obvious that because of the great variety of positions achievable by the subframe 21 and bolster element 52, almost any conceivable frame-straightening operation may be achieved by utilizing one or more subframes 21.

Our invention has been thoroughly tested and found to be completely satisfactory for the accomplishment of the above objects; and while we have disclosed a preferred embodiment thereof, same may well be capable of modification without departure from the scope and spirit of the appended claims.

What is claimed is:
1. In a device of the class described,
 (a) spaced apart parallel first and second U-shaped guide-acting frame members each having opposed legs spaced apart a sufficient distance to receive a vehicle therebetween,
 (b) means rigidly mounting said frame members in generally horizontal positions on a common support and defining therebetween a U-shaped passageway,
 (c) means fixedly positioned relative to said first frame member and defining a longitudinally extended vehicle-supporting surface partially surrounded by said U-shaped passageway,
 (d) a subframe bridging said frame members and mounted and guided thereon for movements longitudinal of said passageway to be selectively positioned about the periphery of said vehicle supporting surface,
 (e) a generally upright boom mounted and guided in said subframe for raising and lowering movements with respect thereto,
 (f) a flexible cable associated with said boom and entrained over pulley means thereon for extending and retracting movements,
 (g) power means carried by said subframe for imparting retracting movements to said cable, and
 (h) means for locking said subframe in selected positions along its path of travel in said passageway.
2. The structure defined in claim 1 in which said last mentioned means is responsive to actuation of said power means when said cable is coupled to a vehicle supported on said vehicle-supporting surface.
3. The structure defined in claim 1 in further combination with bolster means mounted intermediate the opposed legs of said first frame member for longitudinal movements thereof.

4. The structure defined in claim 3 in which said bolster means includes:
   (a) a horizontally disposed beam having its opposite ends in slidable engagement with said opposed legs of said first frame member,
   (b) and an upstanding bolster element mounted for compound sliding movements normal to the axis of said beam and longitudinally thereof, and in further combination with means for locking said bolster element in selected positions of said movements.

5. The structure defined in claim 1 in further combination with means for positively locking said boom in selected vertically adjusted positions and in which said flexible cable is further entrained through pulley means on the lower end portion of said boom from a source of power laterally offset from said boom, whereby vertical upward movements may be imparted to said boom by securing the free end of said cable to said boom and imparting retracting movements to said cable.

6. The structure defined in claim 5 in which said boom includes an angularly disposed tubular head mounted for rotation on the axis of said boom, the upper of said pulleys being carried by said head.

7. The structure defined in claim 1 in which said subframe is generally V-shaped, with the apex thereof in engagement with said first guide-acting frame member.

8. The structure defined in claim 1 in which said first and second U-shaped guide-acting frame members are in the nature of I-beams so disposed as to define laterally opening guide channels, opposed ones of said guide channels receiving opposite end portions of said subframe, and means permitting limited vertical movements of the outer end of said subframe with respect to said second guide rail, said means for locking said subframe in a selected position along said path of travel including a longitudinally extended latch member carried by said second frame member and a cooperating latch member carried by said subframe and engageable with said first mentioned latch member only when the outer end of said subframe is moved upwardly to the limit of its vertical movement.

9. The structure defined in claim 8 in which
   (a) the apex-forming inner end of said subframe is likewise mounted for limited vertical movements with respect to said first frame member,
   (b) and in further combination with a carriage mounted for limited vertical movements on the apex-forming inner end of said subframe and having a roller element thereon which is journalled for rotation on a horizontal axis normal to the path of travel of said subframe, and
   (c) means yieldingly biasing said carriage in a downward direction whereby to cause engagement of said roller element with the underlying wall of the adjacent channel, but permitting retraction of said roller element within said subframe responsive to actuation of said winch when same is coupled to a vehicle supported on said tread rails.

References Cited by the Examiner
UNITED STATES PATENTS

| | | | |
|---|---|---|---|
| 2,013,785 | 9/1935 | Merrill | 72—705 |
| 2,559,250 | 7/1951 | Jackson | 72—455 |
| 2,563,527 | 8/1951 | Gingrich et al. | 72—455 |
| 2,692,002 | 10/1954 | Merrill et al. | 72—705 |
| 3,122,194 | 2/1964 | Bronson et al. | 72—705 |

CHARLES W. LANHAM, *Primary Examiner.*

L. A. LARSON, *Assistant Examiner.*